(12) United States Patent
Takaso

(10) Patent No.: US 11,932,246 B2
(45) Date of Patent: Mar. 19, 2024

(54) DRIVING ASSIST APPARATUS FOR MANUAL TRANSMISSION VEHICLE

(71) Applicant: SUBARU CORPORATION, Tokyo (JP)

(72) Inventor: Yasushi Takaso, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 466 days.

(21) Appl. No.: 16/907,429

(22) Filed: Jun. 22, 2020

(65) Prior Publication Data

US 2021/0078574 A1    Mar. 18, 2021

(30) Foreign Application Priority Data

Sep. 18, 2019  (JP) ................................. 2019-169703

(51) Int. Cl.
 *B60W 30/14*  (2006.01)
 *B60W 30/18*  (2012.01)
 *G06V 20/56*  (2022.01)

(52) U.S. Cl.
 CPC .... *B60W 30/143* (2013.01); *B60W 30/18109* (2013.01); *G06V 20/56* (2022.01); *B60W 2510/18* (2013.01); *B60W 2554/80* (2020.02)

(58) Field of Classification Search
 CPC .................................................. B60W 30/143
 See application file for complete search history.

(56) References Cited

U.S. PATENT DOCUMENTS 6,332,654 B1 * 12/2001 Yano ...................... B60T 7/122
                                                    188/353
6,878,096 B1 *  4/2005 Winner ................... B60T 1/062
                                                    701/96

(Continued)

FOREIGN PATENT DOCUMENTS

JP   2000043618 A  *  2/2000
JP   2003-237424 A     8/2003

(Continued)

OTHER PUBLICATIONS

Japanese Notice of Reasons for Refusal issued in corresponding Japanese Patent Application No. 2019-169703, dated May 2, 2023, with English translation.

*Primary Examiner* — Shelley Chen
(74) *Attorney, Agent, or Firm* — Rimon P.C.

(57) ABSTRACT

A driving assist apparatus for a manual transmission vehicle includes a traveling environment information acquisition unit, a power transmission detector and a controller. The traveling environment information acquisition unit is configured to acquire traveling environment information ahead of the vehicle. The power transmission detector is configured to detect engagement or disengagement of power transmission between a drive source and a drive wheel. The controller is configured to, when recognizing a target object ahead of the vehicle based on the traveling environment information acquired by the traveling environment information acquisition unit, control a vehicle speed of the vehicle in accordance with a distance between the vehicle and the target object. When the power transmission detector detects engagement of power transmission, the controller performs automatic brake control in accordance with a distance (Continued)

between a vehicle and a target object ahead of the vehicle acquired by the traveling environment information acquisition unit.

6 Claims, 6 Drawing Sheets

(56) References Cited

U.S. PATENT DOCUMENTS

| | | | | |
|---|---|---|---|---|
| 9,327,730 | B2* | 5/2016 | Miller | B60W 10/18 |
| 9,856,977 | B2* | 1/2018 | Kinoshita | F16H 61/18 |
| 10,363,932 | B2* | 7/2019 | Lee | B60W 10/02 |
| 2004/0019426 | A1* | 1/2004 | Knoop | B60T 7/22 |
| | | | | 340/436 |
| 2007/0225117 | A1* | 9/2007 | Shimizu | B60W 30/18109 |
| | | | | 477/182 |
| 2009/0150034 | A1* | 6/2009 | Ezoe | B60T 7/22 |
| | | | | 701/53 |
| 2012/0046841 | A1* | 2/2012 | Wurthner | B60W 10/10 |
| | | | | 701/55 |
| 2012/0220422 | A1* | 8/2012 | Wurthner | B60W 10/06 |
| 2012/0220424 | A1* | 8/2012 | Staudinger | B60W 30/18072 |
| | | | | 477/80 |
| 2014/0188364 | A1* | 7/2014 | Kang | B60T 11/18 |
| | | | | 701/70 |
| 2015/0142280 | A1* | 5/2015 | Tamoto | B60W 30/19 |
| | | | | 701/53 |
| 2017/0015308 | A1* | 1/2017 | Ortmann | B60W 10/02 |
| 2017/0274900 | A1* | 9/2017 | Lee | B60W 30/18072 |
| 2018/0066748 | A1* | 3/2018 | Hu | F16H 61/0213 |
| 2018/0354514 | A1* | 12/2018 | John | B60W 30/143 |
| 2019/0054917 | A1* | 2/2019 | Sommer | B60K 28/10 |
| 2019/0353243 | A1* | 11/2019 | Yamada | F16H 61/143 |

FOREIGN PATENT DOCUMENTS

| | | | |
|---|---|---|---|
| JP | 2003237424 A | * | 8/2003 |
| JP | 2007-030807 A | | 2/2007 |
| JP | 2011-189891 A | | 9/2011 |
| JP | 2015-056008 A | | 3/2015 |

\* cited by examiner

DRIVING ASSIST APPARATUS FOR MANUAL TRANSMISSION VEHICLE

CROSS-REFERENCE TO RELATED APPLICATIONS

The present application claims priority from Japanese Patent Application No. 2019-169703 filed on Sep. 18, 2019 the entire contents of which are hereby incorporated by reference.

BACKGROUND

The technology relates to a driving assist apparatus for a manual transmission vehicle configured to slow down a vehicle to a predetermined speed by activating an automatic brake even when a driver intentionally disengages power transmission between an engine and drive wheels.

Driving assist apparatuses control traveling of a vehicle through active lane keep (ALK) control that sets a target travel path on which the vehicle should travel at a lane center and assists steering so that the vehicle travels along the target travel path, and through adaptive cruise control (ACC) that causes the vehicle to travel at a predetermined vehicle speed (set vehicle speed) and follows, when approaching a preceding vehicle, the preceding vehicle while maintaining a predetermined inter-vehicle distance from the preceding vehicle.

The driving assist apparatuses are adopted not only for automatic transmission vehicles but also for manual transmission vehicles. Adopting the driving assist apparatuses for manual transmission vehicles makes it possible to assist drivers in steering operation or brake and accelerator operations in normal traveling, and lighten the drivers' burdens in the same way as in automatic transmission vehicles.

To stop a vehicle, a driver who operates a manual transmission vehicle needs to step on the brake pedal and step on the clutch pedal or step on the clutch pedal and then return the shift lever to a neutral position and disengage power transmission between the engine and drive wheels.

During deceleration, the driving assist apparatuses for manual transmission vehicles can perform ALK control in the same way as for automatic transmission vehicles, whereas the drivers need to perform shift down operation in accordance with deceleration. However, when drivers who find it troublesome to make a shift down each time determine that the vehicle apparently needs to be stopped for a red light or traffic jam, they step on the clutch pedal early without making a shift down, return the shift lever to the neutral position and disengage the power transmission between the engine and the drive wheels. The drivers step on the brake pedal in this condition, slow down and stop the vehicles with only a braking force of the foot brake.

When the power transmission between the engine and the drive wheels is disengaged, the ACC control of manual transmission vehicles cannot perform acceleration control, but can perform deceleration control by activating an automatic brake. For example, Japanese Unexamined Patent Application Publication (JP-A) No. 2003-237424 discloses a technique in which when a driver of a manual transmission vehicle disengages power transmission between the engine and the drive wheels during deceleration, in a state where an inter-vehicle distance from a preceding vehicle is less than a predetermined value, engine brake braking force is calculated and then a brake fluid pressure corresponding to the engine brake braking force is calculated, to obtain a braking force that compensates for the engine brake.

SUMMARY

An aspect of the technology provides a driving assist apparatus for a manual transmission vehicle. The apparatus includes a traveling environment information acquisition unit, a power transmission detector, and a vehicle speed controller. The traveling environment information acquisition unit is configured to acquire traveling environment information ahead of the vehicle. The power transmission detector is configured to detect engagement or disengagement of power transmission between a drive source and a drive wheel. The vehicle speed controller is configured to, when recognizing a target object ahead of the vehicle on a basis of the traveling environment information acquired by the traveling environment information acquisition unit, control a vehicle speed of the vehicle in accordance with a distance between the vehicle and the target object. When the power transmission detector detects the disengagement of the power transmission, the vehicle speed controller performs automatic brake control in accordance with the distance between the vehicle and the target object ahead of the vehicle acquired by the traveling environment information acquisition unit.

An of the technology provides a driving assist apparatus for a manual transmission vehicle. The apparatus includes circuitry. The circuitry is configured to acquire traveling environment information ahead of the vehicle. The circuitry is configured to detect engagement or disengagement of power transmission between a drive source and a drive wheel. When recognizing a target object ahead of the vehicle on a basis of the acquired traveling environment information, the circuitry is configured to control a vehicle speed of the vehicle in accordance with a distance between the vehicle and the target object. When the disengagement of the power transmission is detected, the circuitry is configured to control a perform automatic brake control in accordance with the distance between the vehicle and the acquired target object ahead of the vehicle.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

DETAILED DESCRIPTION

In general, a driving assist apparatus performing ALK control and ACC control often automatically cancels driving assist control when a vehicle speed falls below a predetermined threshold (for example, 30 [Km/h]). A driving assist apparatus for a manual transmission vehicle often cancels driving assist control if the shift lever continues to be positioned at the neutral position for a certain time period in the case where the shift lever is returned to the neutral position during deceleration traveling.

In the technique disclosed in JP-A No. 2003-237424, even when a braking force that compensates for an engine brake with a brake fluid pressure is set, automatic brake control operated by ACC control is uniformly canceled when the vehicle speed falls below a threshold.

As a result, a phenomenon similar to a loss of engine brake occurs, and there is inconvenience that gives the driver an uncomfortable feeling.

Considering the abovementioned situations, it is desirable to provide a driving assist apparatus for a manual transmission vehicle capable of lightening the driver's burden of stepping on a brake pedal when disengaging power transmission early in deceleration traveling and achieving a high degree of convenience.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
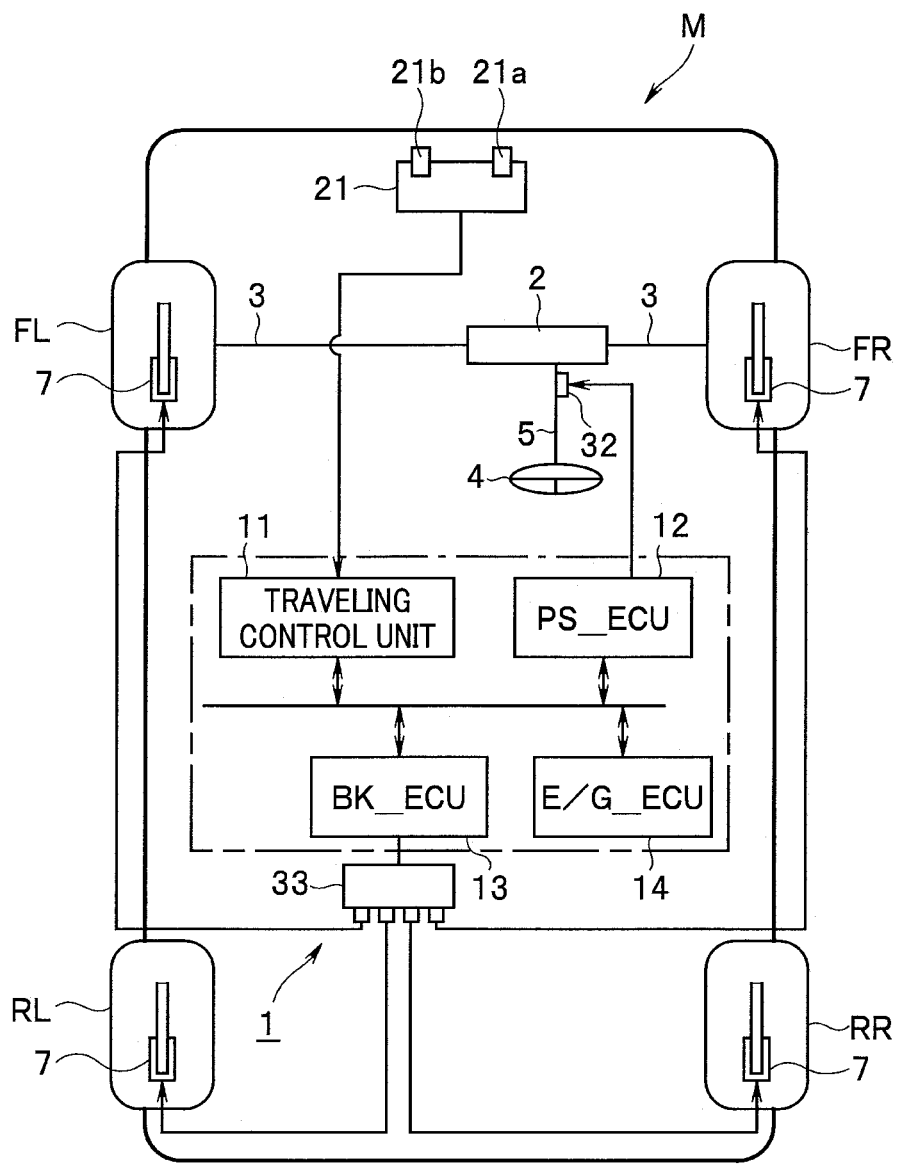
FIG. 1 is a schematic configuration diagram of a manual transmission vehicle mounted with a driving assist apparatus.

A vehicle M in FIG. 1 is a manual transmission vehicle and a shift lever (not illustrated) for the driver to perform operation to change the vehicle speed is disposed in the vicinity of the driver's seat and a clutch pedal is disposed on the driver's seat floor in addition to an accelerator pedal and a brake pedal.

Left and right front wheels FL and FR of the vehicle M are wheels operated by a steering wheel, and are coupled to a steering mechanism 2 such as a rack and pinion mechanism via a tie-rod 3. A steering shaft 5, which has a distal end to which a steering wheel 4 is fixed, is coupled to the steering mechanism 2. When the driver operates the steering wheel 4, the front wheels FL and FR are steered via the steering mechanism 2. Furthermore, the vehicle M is a four-wheel drive vehicle, and therefore all the left and right front wheels FL and FR, and left and right rear wheels RL and RR are drive wheels. Note that the drive wheels FL, FR, RL and RR will be generically referred to as "drive wheels AW" hereinafter for the sake of convenience. It goes without saying that the present embodiment is applicable not only to four-wheel drive vehicles but also to front wheel drive vehicles and rear wheel drive vehicles.

Though not illustrated, the drive wheels AW are coupled to the engine as a drive source via a manual transmission gear (hereinafter simply referred to as "transmission") and further, a clutch is disposed between the engine and the transmission. When the driver steps on the clutch pedal, the clutch is disconnected to disengage the power transmission between the engine and the transmission. On the other hand, when the driver releases the clutch pedal, the clutch is engaged, and power transmission between the engine and the transmission is enabled. A drive force is transmitted from the engine to the drive wheels AW during acceleration and a reverse drive force is transmitted from the drive wheel AW to the engine during deceleration. This reverse drive force becomes an engine brake.

Brake units (disk brakes in the drawing) 7 are disposed on the respective wheels FL, FR, RL and RR. When the driver steps on the brake pedal, the respective brake units 7 operate at a brake fluid pressure corresponding to the stepping amount of the brake pedal, restrict the rotations of the respective wheels FL, FR, RL and RR by friction braking, decelerate the vehicle M or keep the vehicle M in a stopped state.

Figure 2:
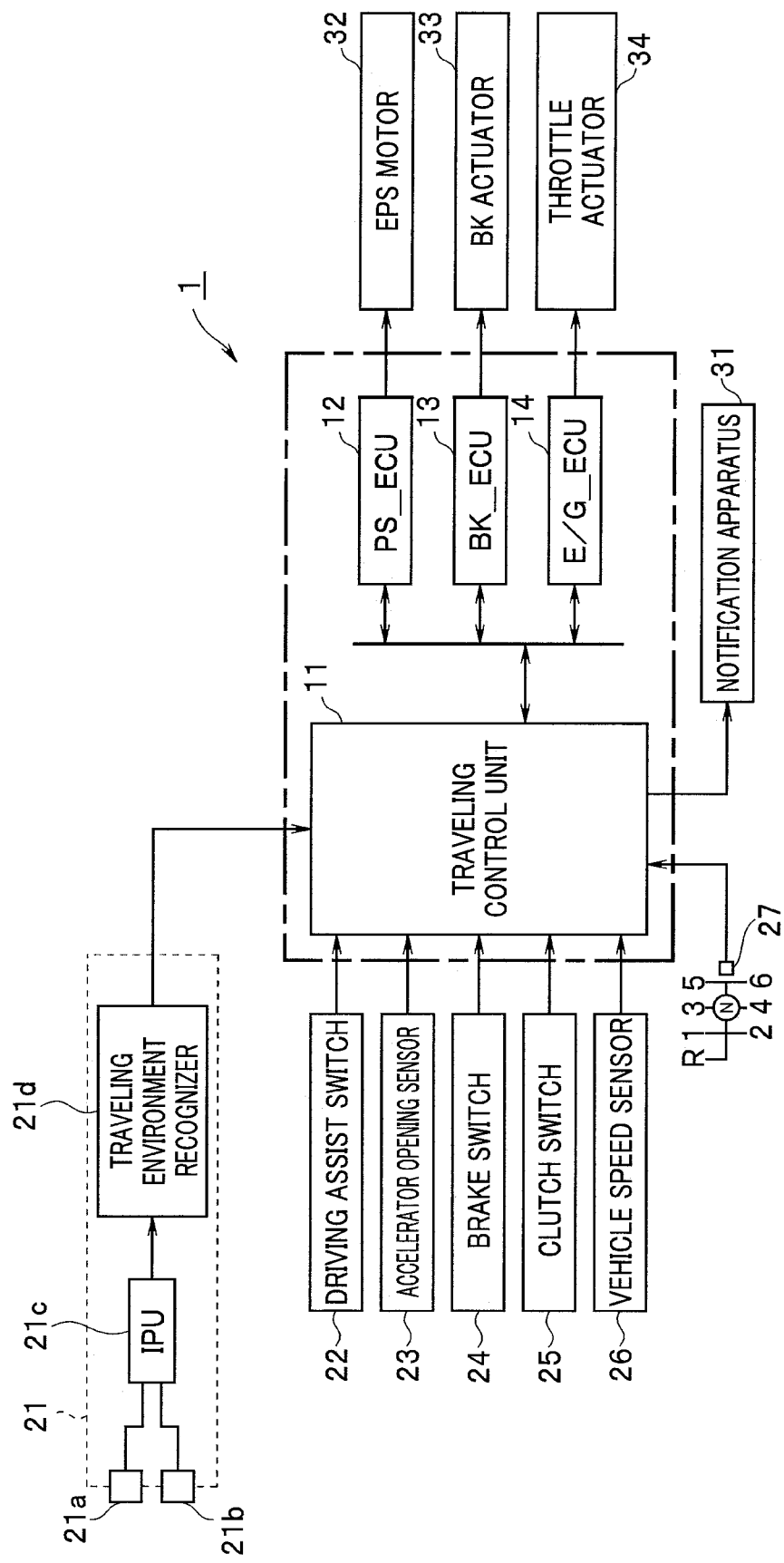
FIG. 2 is an overall configuration diagram of the driving assist apparatus.

In stopping the vehicle M from the traveling state, while gradually stepping on the brake pedal to decelerate the vehicle, the driver makes a shift down in the state where the power transmission between the engine and the drive wheels AW is temporarily disengaged by stepping on the clutch pedal, in order to select a shift stage corresponding to the vehicle speed. Next, the driver releases the clutch pedal to engage the clutch to cause the engine brake to operate, and steps on the clutch pedal again immediately before a target stop position to thereby disengage the power transmission between the engine and the drive wheels AW and stop the vehicle. This transmission is a six-speed gear with forward six speeds and one reverse speed as illustrated, for example, in FIG. 2, and a shift stage is selected by operation of the shift lever. When the driver operates the shift lever to release the engagement with each shift gear, the shift lever is returned to the neutral position.

The vehicle M is mounted with a driving assist apparatus 1. The driving assist apparatus 1 is constructed of a traveling control unit 11, a power steering control unit (PS_ECU) 12, a brake control unit (BK_ECU) 13, and an engine control unit (E/G_ECU) 14, and a camera unit 21 as a traveling environment information acquisition unit, which are coupled together in a bidirectionally communicable way via an in-vehicle communication channel (for example, CAN: controller area network). Note that the respective control units 11 to 14 and the traveling environment recognizer 21*d*, which will be described later, mounted on the camera unit 21 are constructed of a well-known microcomputer provided with a CPU, a RAM, a ROM, a non-volatile storage and the like, and peripheral devices thereof, and the ROM stores programs to be executed by the CPU, fixed data such as tables and maps in advance.

The camera unit 21 is coupled to an input side of the traveling control unit 11. The camera unit 21 is fixed at the center in an upper part at the front of the vehicle room of the vehicle M and includes a vehicle-mounted camera (stereo camera) composed of a main camera 21*a* and a subcamera 21*b* disposed at left and right symmetric positions across the center (vehicle width center) in the vehicle width direction, an image processing unit (IPU) 21*c*, and the traveling environment recognizer 21*d*. The camera unit 21 acquires reference image data using the main camera 21*a* and acquires comparison image data using the subcamera 21*b*.

The IPU 21*c* applies predetermined image processing to both image data. The traveling environment recognizer 21*d* reads the reference image data and the comparison image data image-processed by the IPU 21*c*, recognizes an identical object in both images based on a parallax in the images, calculates distance data (distance from the vehicle M to the object) using principles of triangulation and recognizes traveling environment information ahead and around the vehicle M.

Examples of the object acquired from the traveling environment information include a road shape (lane markers for defining the left and right of a lane, road curvature [1/m] at the center between the lane markers, and a width (lane width) between the left and right lane markers) of the lane (traveling lane) in which the vehicle M is traveling, a forward stop line, an intersection, a traffic signal, signal indication (lighting color, arrow signal or the like), road sign, and a forward obstacle (crossing pedestrian, bicycle, electric pole, telegraph pole, parked vehicle or the like), and these objects are recognized using a well-known technique such as pattern matching. Note that the traveling environment information may also be acquired from a ultrasound sensor, a millimeter wave radar, a LiDAR (light detection and ranging) together with the stereo camera or instead of the stereo camera. Alternatively, the traveling environment information may also be acquired by a monocular camera in combination with the above-described sensor or the like.

The forward traveling environment information is read by the traveling control unit 11. Sensors and switches are further coupled to the input side of the traveling control unit 11. The sensors and switches include a driving assist switch 22 disposed around the steering wheel 4 and configured to turn ON/OFF driving assist control consisting of ALK control and ACC control, an accelerator opening sensor 23 that detects an amount of stepping on the accelerator pedal by the driver, a brake switch 24 that detects the driver's stepping on the brake pedal and performs ON operation, a clutch switch 25 that detects the driver's stepping on the clutch pedal and performs ON operation, a vehicle speed sensor 26 that detects a vehicle speed, and a neutral switch 27 that turns ON when the shift lever is returned to the neutral position. A notification apparatus that notifies the driver of an alarm or the like using a voice, a buzzer, a monitor display or the like is further coupled to the output side of the traveling control unit 11. In one embodiment, the clutch switch 25 and the neutral switch 27 may server as a "power transmission detector" that detects engagement or disengagement of power transmission.

On the other hand, an electric power steering (EPS) motor 32 is coupled to the output side of the PS_ECU 12. The EPS motor 32 adds assist torque corresponding to a drive signal from the PS_ECU 12 to the steering shaft 5.

A brake actuator 33 is coupled to the output side of the BK_ECU 13. The brake actuator 33 adjusts a brake fluid pressure to be supplied to the brake unit 7 provided for each of the wheels FL, FR, RL or RR, and when the brake fluid pressure is applied to the brake unit 7, the rotation of each of the wheels FL, FR, RL or RR is restricted by a friction braking force corresponding to the brake fluid pressure and the vehicle M is forcibly decelerated.

A throttle actuator 34 provided for an electronic control throttle (ETC) (not illustrated) is coupled to the output side of an E/G_ECU 14. The electronic control throttle is attached to a throttle body of the engine. The throttle actuator 34 is coupled to a throttle valve, causes the throttle valve to open/close according to a drive signal from the E/G_ECU 14 to thereby adjust the vehicle speed during traveling.

When the driving assist switch 22 is ON, the aforementioned traveling control unit 11 sets, as a target travel path, the center between the lane markers recognized based on the traveling environment information ahead of the vehicle M detected by the camera unit 21. The traveling control unit 11 calculates a steering angle for converging a lateral position difference based on the lateral position difference between the target travel path and the travel path on which the vehicle M is actually traveling, outputs the steering angle to the PS_ECU 12 and causes the PS_ECU 12 to perform ALK control.

The traveling control unit 11 outputs control signals to the BK_ECU 13 and the E/G_ECU 14 during traveling and causes these units to perform ACC control. During traveling, the ACC control performs following control for following the preceding vehicle while keeping a set inter-vehicle distance when the traveling environment recognizer 21*d* of the camera unit 21 detects a preceding vehicle, and performs constant speed traveling control for causing the vehicle to travel at a vehicle speed set by the driver (set vehicle speed) when the traveling environment recognizer 21*d* detects no preceding vehicle. In one embodiment, the traveling control unit 11 may serve as a "vehicle speed controller".

When the driving assist switch 22 is OFF, the driving assist apparatus (ALK control, ACC control) by the traveling control unit 11 is canceled. Therefore, the PS_ECU 12 detects steering torque applied by the driver to the steering wheel 4 using a torque sensor (not illustrated), calculates assist torque to assist the steering torque, sets EPS torque corresponding to the assist torque and drives the EPS motor 32. The E/G_ECU 14 outputs a drive signal following the accelerator operation to the throttle actuator 34 and allows the driver to realize traveling according to the driver's intention.

When the traveling environment recognizer 21*d* of the camera unit 21 detects an obstacle ahead, and if it is difficult to avoid the obstacle, the traveling control unit 11 outputs a brake signal to the BK_ECU 13 regardless of ON/OFF of the driving assist switch 22, causes each of the brake units 7 to generate a braking force corresponding to the time to reach the obstacle according to the brake fluid pressure from the brake actuator 33 to avoid collision or lighten damage caused by the collision (pre-crash brake control). Note that since the vehicle in the embodiment is a manual transmission vehicle, the engine stops when the vehicle stops with the drive wheels AW locked.

According to the aforementioned ACC control in the manual transmission vehicle, when the driver steps on the clutch pedal or even when the clutch pedal is released, if the shift lever is returned to the neutral position, acceleration control by the E/G_ECU 14 or deceleration control by engine braking cannot be performed. However, automatic brake control by the BK_ECU 13 is possible. Note that the ALK control continues regardless of ON/OFF of the automatic brake control unless the driver performs steering override operation.

Generally, when a driver driving a manual transmission vehicle causes the vehicle to enter an intersection and tries to stop the vehicle M at a stop line, which is a target object, the driver uses both engine brake and foot brake. In that case, making a shift down according to the decelerated vehicle speed makes it possible to allow the engine brake to work effectively. However, when stopping the vehicle, some drivers may find it troublesome to perform shift down operation sequentially.

Therefore, according to the aforementioned traveling control unit 11, when the driver steps on the clutch pedal to make the clutch disengaged or even when the driver returns the shift lever to the neutral position, if the driving assist switch 22 is ON, the BK_ECU 13 can activate the automatic brake without canceling the ACC control.

Figure 3:
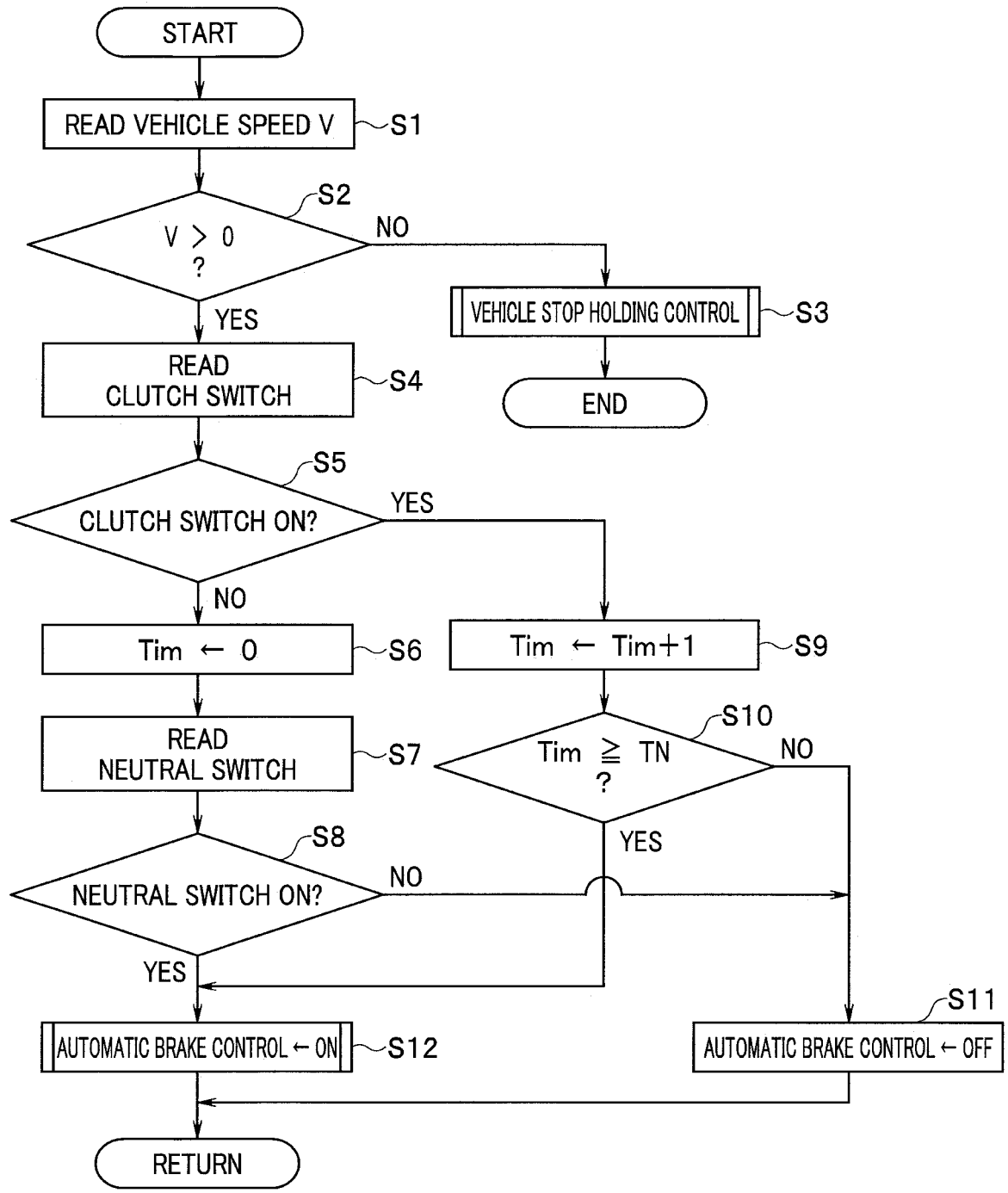
FIG. 3 is a flowchart illustrating an automatic brake control routine.

The automatic brake control performed by the aforementioned traveling control unit 11 is processed, for example, according to an automatic brake control routine illustrated in FIG. 3. In the routine, a vehicle speed V of the vehicle M detected by the vehicle speed sensor 26 is read in step S1 first. After that, the flow proceeds to step S2, where it is examined whether the vehicle speed V is 0, that is, whether the vehicle M is stopped.

When it is determined that the vehicle is stopped (V=0), the flow proceeds to step S3 or the flow proceeds to step S4 when it is determined that the vehicle is traveling (V>0). When the flow proceeds to step S3, stop holding control is performed and the routine ends. The stop holding control is performed when the traveling control unit 11 outputs a brake holding signal to the BK_ECU 13. The BK_ECU 13 outputs a drive signal corresponding to the brake holding signal to the brake actuator 33 and supplies a brake fluid pressure for stopping the vehicle M to each of the brake units 7. Note that if the vehicle M is provided with an electric parking brake (EPB) system, the traveling control unit 11 outputs an ON signal to the EPB system, causes the EPB to hold the stopped state and outputs a brake cancelation signal to the BK_ECU 13.

When the flow proceeds to step S4, a signal of the clutch switch 25 is read and it is examined whether the clutch switch 25 is ON in step S5. The clutch switch 25 performs ON operation when the driver steps on the clutch pedal, and power transmission between the engine and the transmission is disengaged when the clutch pedal is stepped on.

When the clutch switch 25 is OFF, that is, when the clutch is engaged, the flow proceeds to step S6, or when the clutch switch 25 is ON, that is, when the clutch is disengaged, the flow jumps to step S9.

When it is determined that the clutch switch 25 is OFF and the flow proceeds to step S6, a clutch ON continuation time Tim is cleared (Tim←0), the flow proceeds to step S7 where a signal of the neutral switch 27 is read. The neutral switch 27 is turned ON with the shift lever returned to the neutral position.

Then, the flow proceeds to step S8 where it is examined whether the neutral switch 27 is ON, and when the neutral switch 27 is ON, that is, when power transmission between the engine and the drive wheels AW is disengaged, the flow proceeds to step S12. When the neutral switch 27 is OFF, that is, when the state between the engine and the drive wheels AW is in a power transmitting state, the flow branches to step S11.

On the other hand, when the flow branches from step S5 to step S9, the clutch ON continuation time Tim is incremented (Tim←Tim+1), and the flow proceeds to step S10 where it is examined whether the clutch ON continuation time Tim has reached a set time TN. When the driver makes a shift change, the driver always steps on the clutch pedal, and therefore the set time TN is intended to eliminate the ON time of the clutch switch 25 caused by the shift change, and is calculated and set in advance based on an experiment or the like. Note that the set time TN may be made variable according to the driver's preference.

When Tim<TN, it is determined that the clutch ON time is within a clutch operation time involved in a normal shift operation and the flow proceeds to step S11. When Tim≥TN, it is determined that the clutch is intentionally disengaged and the flow proceeds to step S12. On the other hand, when the flow branches from step S8 or step S10 to step S11, automatic brake control, which will be described later, is turned OFF and the flow exits the routine.

On the other hand, when the flow proceeds from step S8 or step S10 to step S12, the automatic brake control is turned ON and the flow exits the routine.

Figure 4:
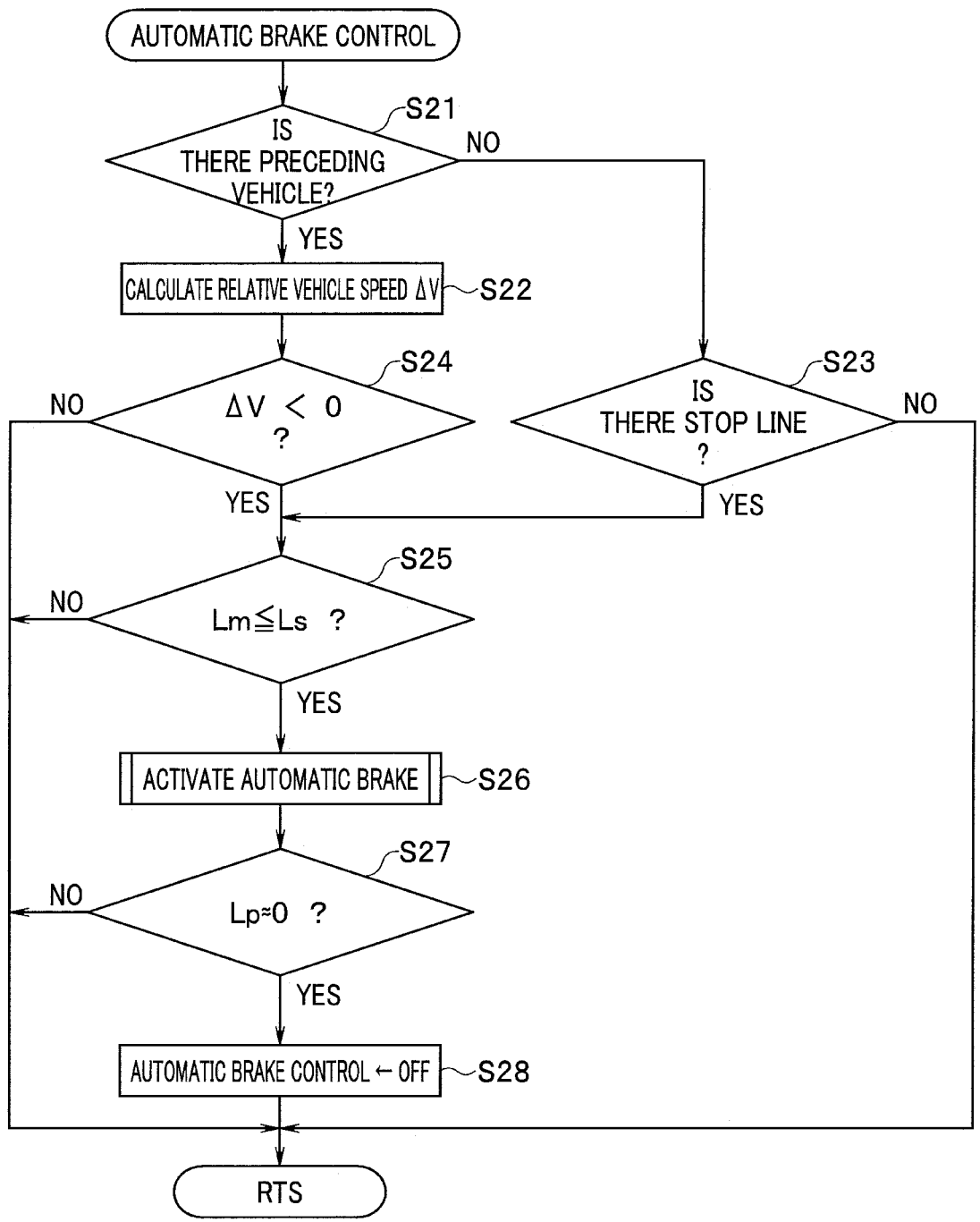
FIG. 4 is a flowchart illustrating an automatic brake control routine.

When the automatic brake control is turned ON in step S12, an automatic brake control subroutine illustrated in FIG. 4 is executed. In the subroutine, first it is examined, in step S21, whether the traveling environment recognizer 21d of the camera unit 21 has detected a preceding vehicle F (see FIG. 6), which is a target object, ahead of the vehicle M. When the traveling environment recognizer 21d has detected the preceding vehicle F, the flow proceeds to step S22. When no preceding vehicle F has been detected, the flow branches to step S23.

When the flow proceeds to step S22, a relative vehicle speed ΔV between the vehicle M and the preceding vehicle F is calculated (ΔV=vehicle speed of the preceding vehicle F−vehicle speed of the vehicle M) from a change in the inter-vehicle distance between the vehicle M and the preceding vehicle F detected by the traveling environment recognizer 21d of the camera unit 21. Next, the flow proceeds to step S24 where it is examined whether the relative vehicle speed ΔV is less than 0. When the vehicle M is approaching the preceding vehicle F (ΔV<0), the flow proceeds to step S25. When the inter-vehicle distance between the vehicle M and the preceding vehicle is constant or increasing (ΔV≥0), the brake need not be operated, and the flow exits the routine.

After that, when the flow proceeds from step S23 or step S24 to step S25, a distance (object inter-vehicle distance) Lm to the preceding vehicle F or a stop line, which is a target object, is compared with the control start distance Ls. The control start distance Ls is a variable value set by a table retrieval or the like based on the vehicle speed V, and is set longer as the vehicle speed V of the vehicle M increases.

When the object inter-vehicle distance Lm is longer than the control start distance Ls (Lm<Ls), the flow exits the routine. When the object inter-vehicle distance Lm has reached the control start distance Ls (Lm≤Ls), the flow proceeds to step S26 where a brake fluid pressure signal for performing brake operation is transmitted to the BK_ECU 13 to activate the automatic brake. The brake fluid pressure signal is set with reference to a brake fluid pressure setting map illustrated in FIG. 5 and based on the vehicle speed V and the target position inter-vehicle distance Lp.

Figure 6:
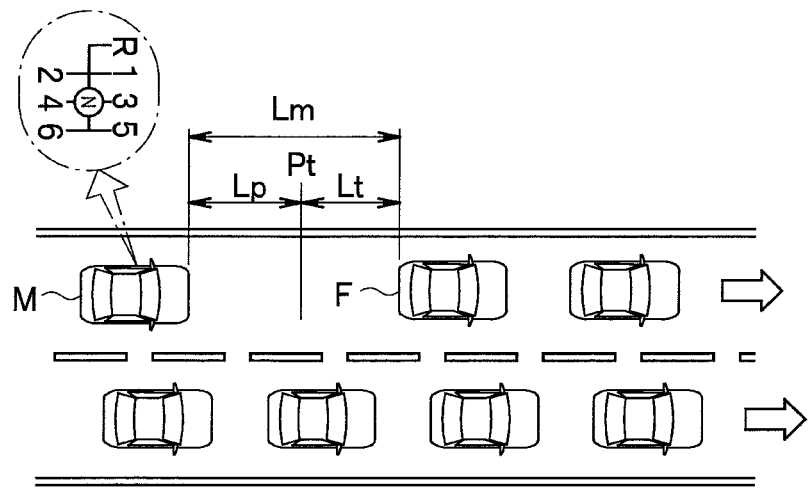
FIG. 6 is an explanatory diagram illustrating automatic brake control when a shift position is returned to neutral during traffic jam.
Figure 7:
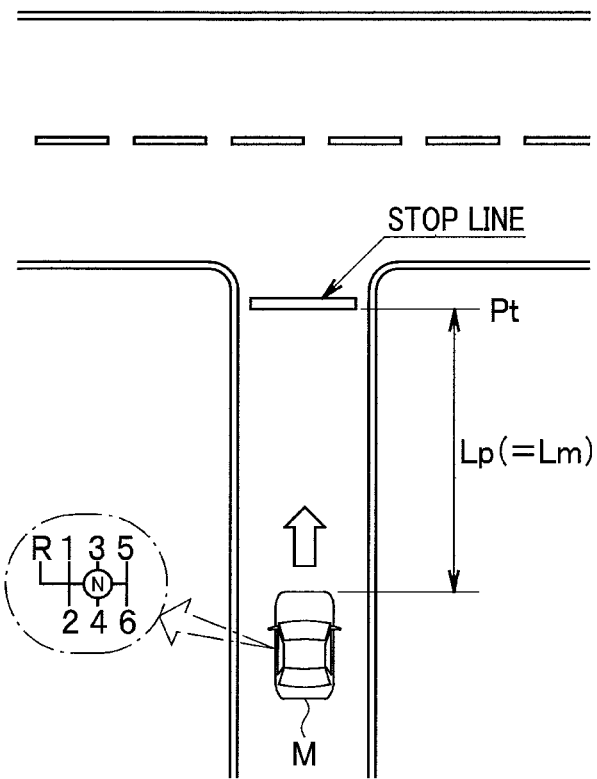
FIG. 7 is an explanatory diagram illustrating automatic brake control when the shift position is returned to neutral in front of a stop line.

The target position inter-vehicle distance Lp is a distance between the vehicle M and the target position Pt, and when the vehicle M is following the preceding vehicle F as illustrated in FIG. 6, the target position Pt is set in front of the preceding vehicle F by a target inter-vehicle distance Lt set based on the vehicle speed V of the vehicle M or the vehicle speed of the preceding vehicle F. Furthermore, in the case of a stop line as illustrated in FIG. 7, a near-side edge of the stop line is set as the target position Pt. Therefore, the target position inter-vehicle distance Lp is a distance obtained by subtracting the target inter-vehicle distance Lt from the object inter-vehicle distance Lm (Lp=Lm−Lt) in FIG. 6. In FIG. 7, the target position inter-vehicle distance Lp is equal to the object inter-vehicle distance Lm (Lp=Lm).

Figure 5:
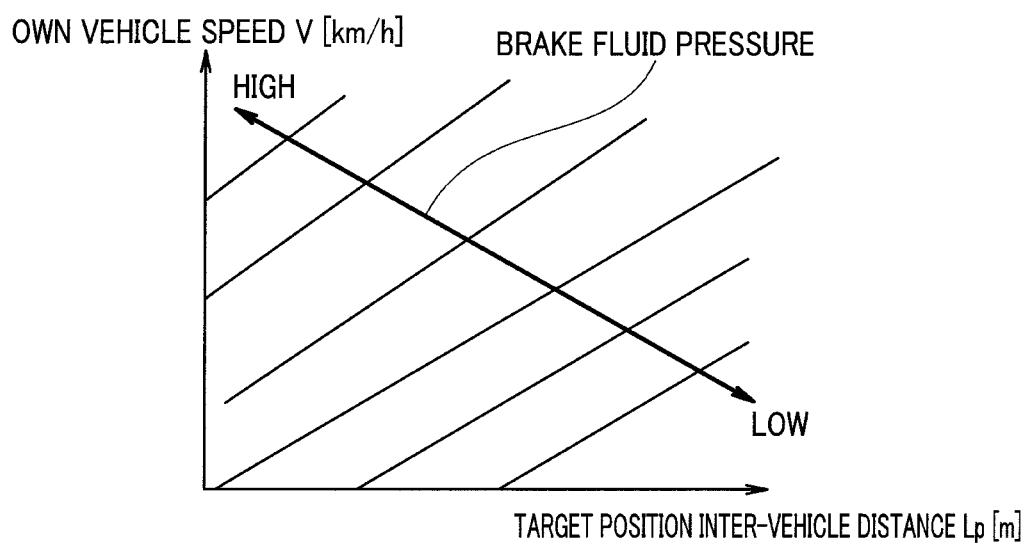
FIG. 5 is a conceptual diagram of a brake fluid pressure setting map.

In the brake fluid pressure setting map illustrated in FIG. 5, as the vehicle speed V becomes higher and the target position inter-vehicle distance Lp becomes shorter, the brake fluid pressure is set to be higher. Therefore, when the vehicle M is stopped at the stop line, the BK_ECU 13 transmits a drive signal corresponding to the brake fluid pressure signal to the brake actuator 33, activates the automatic brake and causes the vehicle M to perform deceleration traveling. In that case, the brake fluid pressure is gradually set to a higher value as the vehicle M approaches the target position Pt set for the preceding vehicle F stopped due to, for example, traffic jam or the target position Pt set at the stop line.

After that, the flow proceeds to step S27 where it is examined whether the target position inter-vehicle distance Lp is approximately 0 [m], that is, whether the front end of the vehicle M has reached a predetermined error range with respect to the target position Pt. When the vehicle M has not reached the target position Pt yet, the flow exits the routine. On the other hand, when the vehicle M has reached the target position Pt (Lp≈0), the flow proceeds to step S28 where the automatic brake control is canceled (OFF) and the flow exits the routine. Note that when the vehicle M is caused to stop at the stop line by the automatic brake control as illustrated in FIG. 7, the BK_ECU 13 causes the braking state to be kept until the accelerator opening sensor 23 detects the stepping on the accelerator pedal by the driver. Alternatively, when the vehicle M is mounted with an electric parking brake (EPB) system, the application of the brake fluid pressure by the brake actuator may be canceled and a parking brake may be activated.

As a result, in the case of traveling during a traffic jam as illustrated in FIG. 6, for example, when the driver of the vehicle M returns the shift lever to the neutral position, the target inter-vehicle distance Lt is set based on the vehicle speed of the preceding vehicle F or the vehicle speed V of the vehicle M and the target position Pt is set at a position separated from the preceding vehicle F by the target inter-vehicle distance Lt. When the preceding vehicle F is stopped due to a traffic jam, for example, the vehicle M is stopped at the target position Pt by the automatic brake.

Thus, in the present embodiment, when the vehicle M follows the preceding vehicle F or when the vehicle M is caused to perform deceleration traveling so as to stop the vehicle M at the stop line, even if the driver disengages the clutch early or the driver returns the shift lever to the neutral position, driving assist using the automatic brake continues until the vehicle M stops, without the automatic brake being canceled, and therefore the driver need not step on the brake pedal each time to decelerate or stop the vehicle. As a result, a high degree of convenience can be provided.

Note that the technology is not limited to the aforementioned embodiment. For example, the drive source may be an electric motor without being limited to an engine, and in this case, the transmission may be a reduction gear. In addition, disengagement of power transmission may be determined by directly detecting a clutch operation or the neutral position of the transmission itself.

Each of the traveling control unit 11, the PS_ECU 12, the BK_ECU 13 and the E/G_ECU 14 illustrated in FIG. 1 can be implemented not only by the above-described microcomputer, but also by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the traveling control unit 11, the PS_ECU 12, the BK_ECU 13, and the E/G_ECU 14. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIG. 1.

Although an embodiment of the technology has been described in the foregoing by way of example with reference to the accompanying drawings, the technology is by no means limited to the embodiment described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

As described above, according to the technology, when disengagement of power transmission is detected, the vehicle speed controller performs automatic brake control according to the distance between the target object ahead of the vehicle and the vehicle, and so even when the driver disengages power transmission early during deceleration traveling, it is possible to continue driving assist by an automatic brake until the vehicle stops, and lighten the driver's burden of stepping on the brake pedal, to thereby be capable of achieving a high degree of convenience.

The invention claimed is:

1. A driving assist apparatus for a manual transmission vehicle, the apparatus comprising:
a traveling environment information acquisition unit configured to acquire traveling environment information ahead of the vehicle;
a power transmission detector configured to detect engagement or disengagement of power transmission between a drive source and a drive wheel; and
a vehicle speed controller configured to, when recognizing a target object ahead of the vehicle on a basis of the traveling environment information acquired by the traveling environment information acquisition unit, control a vehicle speed of the vehicle in accordance with a distance between the vehicle and the target object, wherein
in response to the power transmission detector detecting the disengagement of the power transmission, the vehicle speed controller performs automatic brake control in accordance with the distance between the vehicle and the target object ahead of the vehicle acquired by the traveling environment information acquisition unit.

2. The driving assist apparatus for a manual transmission vehicle according to claim 1, wherein when the power transmission detector detects that a shift lever is returned to a neutral position, the vehicle speed controller performs the automatic brake control in accordance with the distance between the vehicle and the target object ahead of the vehicle acquired by the traveling environment information acquisition unit.

3. The driving assist apparatus for a manual transmission vehicle according to claim 1, wherein when the power transmission detector detects disengagement of a clutch provided between an engine and a manual transmission, the vehicle speed controller performs the automatic brake control in accordance with the distance between the vehicle and the target object ahead of the vehicle acquired by the traveling environment information acquisition unit in a case that the disengagement of the clutch continues for a predetermined time period.

4. The driving assist apparatus for a manual transmission vehicle according to claim 1, wherein even when the power transmission detector detects disengagement of the power transmission, the vehicle speed controller does not perform the automatic brake control in a case that no target object is recognized ahead of the vehicle from the traveling environment information acquired by the traveling environment information acquisition unit.

5. A driving assist apparatus for a manual transmission vehicle, the driving assist apparatus comprising circuitry configured to:
  acquire traveling environment information ahead of the vehicle;
  detect engagement or disengagement of power transmission between a drive source and drive a wheel;
  when recognizing a target object ahead of the vehicle on a basis of the acquired traveling environment information, control a vehicle speed of the vehicle in accordance with a distance between the vehicle and the target object; and
  in response to the disengagement of the power transmission being detected, perform automatic brake control in accordance with the distance between the vehicle and the acquired target object ahead of the vehicle.

6. The driving assist apparatus for a manual transmission vehicle according to claim 2, wherein when the power transmission detector detects disengagement of a clutch provided between an engine and a manual transmission, the vehicle speed controller performs the automatic brake control in accordance with the distance between the vehicle and the target object ahead of the vehicle acquired by the traveling environment information acquisition unit in a case that the disengagement of the clutch continues for a predetermined time period.

* * * * *